United States Patent [19]

O'Connor

[11] Patent Number: 4,573,611
[45] Date of Patent: Mar. 4, 1986

[54] NON-REFILLABLE VALVE
[75] Inventor: Robert F. O'Connor, Greenville, R.I.
[73] Assignee: Amtrol Inc., West Warwick, R.I.
[21] Appl. No.: 619,503
[22] Filed: Jun. 11, 1984
[51] Int. Cl.⁴ .............................................. B65D 47/02
[52] U.S. Cl. ..................................... 222/147; 251/111
[58] Field of Search ................. 251/111, 82, 318, 264; 222/3; 137/147, 523

[56] References Cited
U.S. PATENT DOCUMENTS

| | | |
|---|---|---|
| 573,773 | 12/1896 | Fernandes . |
| 619,966 | 2/1899 | Lanser . |
| 680,405 | 8/1901 | Aaron . |
| 680,416 | 8/1901 | Kuhles . |
| 728,759 | 5/1903 | Pillmore et al. . |
| 829,619 | 8/1906 | Atkinson . |
| 871,780 | 11/1907 | Card . |
| 879,000 | 2/1908 | Pitner . |
| 909,890 | 1/1909 | Hammerstein . |
| 1,097,187 | 6/1914 | Pecorella . |
| 1,104,201 | 7/1914 | Lenzi . |
| 1,164,014 | 12/1915 | Phillips . |
| 1,305,747 | 6/1919 | Sechrist . |
| 1,554,127 | 9/1925 | Roberts . |
| 2,279,513 | 4/1942 | Hage .................................. 251/121 |
| 2,368,281 | 1/1945 | Wittenberg ....................... 251/131 |
| 2,372,456 | 3/1945 | Stewart .............................. 137/69 |
| 2,471,383 | 5/1949 | Althuase, Jr. et al. ................. 166/1 |
| 2,699,180 | 1/1955 | Frye ................................ 137/539.5 |
| 2,702,179 | 2/1955 | Grunt . |
| 2,715,512 | 8/1955 | Miller et al. ........................ 251/148 |
| 2,770,255 | 11/1956 | Goddard ............................ 137/529 |
| 2,837,110 | 6/1958 | Graybill ............................. 137/327 |
| 2,914,085 | 11/1959 | Mercier ............................. 137/514 |
| 2,917,073 | 12/1959 | Dinkelkamp ....................... 137/495 |
| 2,931,618 | 4/1960 | Franzreb ............................. 251/88 |
| 3,238,965 | 3/1966 | Masheder ....................... 137/329.05 |
| 3,308,494 | 3/1967 | Licher .................................. 9/317 |
| 3,403,823 | 10/1968 | O'Donnell .......................... 222/153 |
| 3,407,827 | 10/1968 | Follett ................................ 137/39 |
| 3,516,639 | 6/1970 | Himmelman ....................... 251/257 |
| 3,589,386 | 6/1971 | Chapman .......................... 137/269 |
| 3,704,813 | 12/1972 | Devol ................................ 222/147 |
| 3,766,940 | 10/1973 | Mason ............................... 137/460 |
| 3,861,548 | 1/1975 | Bereziat ............................. 215/22 |
| 3,985,332 | 10/1976 | Walker .............................. 251/111 |
| 4,027,851 | 6/1977 | Schlotman .......................... 251/172 |
| 4,286,573 | 9/1981 | Nickel ................................ 126/362 |
| 4,341,330 | 7/1982 | Mascia et al. ...................... 222/401 |
| 4,368,754 | 1/1983 | Roberts ........................... 137/454.5 |

FOREIGN PATENT DOCUMENTS

| | | |
|---|---|---|
| 829185 | 3/1939 | France . |
| 552293 | 11/1956 | France . |
| 23468 | of 1901 | United Kingdom . |
| 29738 | of 1907 | United Kingdom . |
| 20873 | 5/1916 | United Kingdom . |
| 209821 | 1/1924 | United Kingdom . |
| 883459 | 11/1961 | United Kingdom . |
| 1183760 | 3/1970 | United Kingdom . |
| 2071044 | 9/1981 | United Kingdom . |
| 2088317 | 6/1982 | United Kingdom . |

Primary Examiner—Stanley H. Tollberg
Attorney, Agent, or Firm—Fisher, Christen & Sabol

[57] ABSTRACT

Non-refillable valve for a pressure container which includes a housing with a central bore, which has a lower portion that is narrower than its middle portion which in turn is narrower than its upper portion. A side port is present in the lower region of the middle portion and an outlet nozzle is attached to the side port. The lower end of the housing is adapted to sealingly engage the pressure to provide communication therebetween. The valve stem is rotatably positioned in the upper portion of the central bore. A tube is mounted on the internal end of the valve stem which extends into the middle portion of the central bore. A resilient valve sealing member has a body portion and an upper flange that extends upwardly and outwardly from the body. A longitudinal passageway is present part way through the body portion. A vertical post is positioned in the middle of the longitudinal passageway and slidingly engaging the tube on the bottom of the valve stem. The flange portion of the sealing member is compressingly positioned in the upper portion of the central bore when the valve is inactive or being filled. The valve sealing member is pushed into the middle portion by means of the valve stem when the valve is placed in the active position. The sealing member engages the seating interface when any refill of the container with pressurized fluid is attempted.

11 Claims, 5 Drawing Figures

NON-REFILLABLE VALVE

BACKGROUND OF THE INVENTION

1. Field of the Invention

The invention relates to non-refillable or single use valves for pressurized systems.

2. Prior Art

Pressure tanks or other pressure containers are usually filled under carefully controlled conditions at a charging station and then distributed to various places for use. When empty it is intended that the containers be returned to the charging center for appropriate reuse or destruction in the case of single use containers. Unfortunately, the attractive economies of refilling containers at points of use or otherwise repressurizing them under less than carefully supervised conditions has resulted, in the less consequential cases, in the introduction of impurities or inferior refills and, in the more consequential cases, to injurious explosions. The reuse of pressure containers is highly objectionable for many reasons which relate to safety.

U.S. Pat. No. 3,704,813 teaches a fluid dispensing valve assembly having a body one end of which is formed for securement to a container. The body forms a conduit having only one through passage for filling and discharging fluid. There is a shut-off valve operable for controlling the flow of fluid through the passage. The shut-off valve has an externally accessible control. There is convertible means in the body comprising an initially inactive check valve initially in condition to accommodate the flow of fluid through the passage in both the filling and discharge directions. The check valve is convertible after an initial filling operation into an active check valve in the passage in series with the shut-off valve. The initially inactive check valve includes a movable valve member, a valve seat, means for biasing the valve member toward the valve seat, and detent means effective initially to prevent the cooperation of the valve member with the valve seat. The detent means is defeatable after an initial filling operation to enable the valve member to engage the seat. The check valve when active is operative to pass fluid only in the discharge direction. The check valve after being rendered active to obstruct the flow of fluid selectively in the filling direction is guarded against access from the exterior of the valve assembly when secured to a container for reopening the passage to the flow of fluid in the filling direction. Thereby a container equipped with the valve assembly can be evacuated and then filled with fluid in the initial condition of the valve assembly but is substantially non-refillable after conversion of the convertible means.

U.S. Pat. No. 3,985,332 teaches a non-refillable safety valve for a pressure container. The valve includes a housing, having a central bore, which provides communication between a port and the pressure container for charging and selective discharging the pressure container. The central bore has a lower portion that is narrower than the upper portion of the central bore. A hollow knob unit, having a central bore, is in threaded engagement with the outer wall of the housing. A core, having a central bore, is slidably mounted in the central bore of the housing. The upper end of the hollow knob unit is mounted on the core in a rotatable manner and in fixed longitudinal relationship with the core. A sealing member is slidably mounted in the lower end portion of the central bore of the core. The core contains end stop means for preventing movement of the sealing member below the lower end of the core. The sealing member engages the interface ledge formed by the lower upper portions of the central bore of the housing when the core is moved the maximum possible distance into the central bore of the core or when refill is attempted after discharge of the pressure container. The core contains at least one passageway located in the core outwards from the sealing member for communication between the central bore of the core and said upper portion of the central core, of the housing. An engagable stop means is positioned between the outer surface of the housing and the inner surface of the hollow knob unit in order to limit retrograde or outward movement of the core to a position whereby the sealing member still engages the interface ledge when refilling the pressure container. The engagable stop means engages after the pressure container has been filled and the sealing member, the core and the knob unit have been moved into sealing position.

U.S. Pat. No. 871,780 teaches a bottle having a neck provided with a passage and having a valve chamber at the inner end of the neck. A valve seat it formed in the chamber. There is a valve operable in the latter and provided with a compressible head adapted to close upon the seat and of greater diameter than the passage. The valve is elastic, and is inserted into the chamber of the bottle by forcing it in deformed shape down the neck of a bottle by means of a mechanism similar to a screw press. The bottle is inserted into the press box and the screw is used to force the deformed valve down the bottle neck. The valve mechanism is used to prevent fraudulent substitution of contents; use with pressurized fluids is not mentioned.

There is a need for a relatively simple and inexpensive valve which will allow normal filling of the pressure container under proper conditions, adequate sealing of the pressure container during nonuse, selective discharge of the pressure container, and effective prevention of improper and unauthorized refilling of the container.

BROAD DESCRIPTION OF THE INVENTION

An object of the invention is to provide a non-refillable valve for compressed gas containers, for example, cylinders. Another object of the invention is to provide a non-refillable valve, once activated, which will move freely to permit discharge of the pressurized fluid and which will move automatically to the closed position for preventing the introduction of fluid into the container. A further object of the invention is to provide a comparatively simple, inexpensive, non-refillable valve, which when initially filled and sealed will permit discharge of the contents of a pressure container, but which will prevent the introduction of further fluid into the container. A still further object of the invention is to provide a non-refillable valve which will prevent refilling of a pressure container even though it is substantially disassembled. Another object of the invention is to provide a non-refillable valve for pressure containers that fulfills the needs of the art regarding such systems. Another object of the invention is to provide a non-refillable valve which is automatically activated in its non-refillable function by placing in its closed position ready for discharge of pressurized fluid from the pressure container it is mounted on. Other objects and advantages of the invention are set out herein or are obvious herefrom to one ordinarily skilled in the art.

The valve of the invention achieves such objects and advantages.

The invention involves a non-refillable valve for a pressure container which includes a housing. The housing has a central bore which has a lower portion that is narrower than the middle portion of the central bore and which has an upper portion that is narrower than middle portion of the central bore. A side port is present which communicates with the lower region of the middle portion of the central bore. The lower end of the housing is adapted to sealingly engage the pressure container in a manner which provides communication between the pressure container and the lower portion of the central bore. There is an outlet nozzle, having a bore lengthwise therethrough, which is positioned on the side of the housing and which is in communication with the middle portion of the central bore via the side port in the housing. Valve stem means is positioned in the upper portion of the central bore in a rotatable manner which advances the valve stem means back and/or forth in the central bore. A tube is mounted on the internal end of the valve stem means which extends into the middle portion of the central bore. There is also a resilient valve sealing member which has a body portion, and an upper flange that extends upwardly and outwardly from the body. A longitudinal passageway is present in the body portion, the bottom portion of the longitudinal passageway not extending through the bottom of the body portion. A vertical post is positioned in the middle of the longitudinal passageway, thereby forming a slot around the vertical post. The post slidingly engages the tube on the bottom of the valve stem means. The flange portion of the sealing member is compressingly positioned in the upper portion of the central bore when the valve is inactive or being filled. The valve sealing member is pushed into the middle portion by means of the valve stem means when the valve is placed in the active position. The valve sealing member is seated against the interface between the middle and lower portions of the central bore when the valve is closed. The sealing member is positioned in the middle chamber above the seating interface when the valve is used for discharge of the container. The sealing member sealingly engages the seating interface when refill of container with pressurized fluid is attempted.

Preferably the pressure container is a pressurized gas container and preferably the pressurized gas container is a pressurized gas cylinder. The valve stem means is preferably mounted in the upper portion of the central bore in a screwable manner. Preferably the valve stem means has an externally-located knob for turning the valve stem means. An O-ring is preferably mounted in a groove in the valve stem means positioned in the upper portion of the central bore and sealingly engages the surface of the upper portion of the central bore.

Also, preferably the valve sealing member is made of a resilient plastic. Preferably the flange on said body contains at least one vertical slot. Most preferably there are four vertical slots in the flange, thereby forming four resilient arm portions. The post preferably extends upwards to the top of the flange. Preferably the bottom rim of the body portion is bevelled.

The valve sealing member of the invention valve is not prevented from seating by any detent which is external to the valve sealing member itself.

In the inactive phase, the valve sealing member is held in the upper portion of the central bore of the valve housing by the means of the compressed, elastic, upper arm portions of the valve sealing member. This condition allows the passage, formed by the lower and middle portions of the central bore of the housing and the bore of the outlet nozzle to be used in a filling operation. After the container has been filled and the invention valve is placed in the closed position, the valve sealing member assumes its operative configuration for preventing the flow of fluid into the container in the filling direction. The valve sealing member is virtually inaccessible for tampering to hold it open such as would become necessary for refilling the container.

The invention non-refillable valve does not use any spring means to operate the valve sealing member in any of its functions.

The invention valve has a single line of communication or passageway that serves both for the initial filling operation and subsquently for the controlled discharge of fluid. The valve sealing member is initially not located in that passage. The valve sealing is convertible from an initially inactive condition and location utilized during the initial filling operation into its active configuration and location to block subsequent flow in that passage in the filling direction.

When the invention valve is being closed, thus signalling completion of the filling operation, the invention valve automatically causes the valve system to convert to its non-refillable state. The invention valve has a shut off means that incorporates the valve sealing member to control and/or stop the delivery of fluid from the pressure container.

The invention valve is a non-refillable valve that allows one filling and then selective discharging. The invention valve is designed to prevent, and does prevent, the refilling of a pressure container. In this manner, the invention valve allows actual attainment of governmental requirements for a valve that prevents refilling of certain pressure containers.

The invention valve is effective, but relatively simple, and is inexpensive to construct. The invention valve is fail-proof in the matter of charging, storing and selective discharging. Subsequent filling of the pressure container is prevented by the invention valve.

The non-refillable valve of the invention can be used for fluids, i.e., gases and/or liquids. The fluid can contain solids that are discharged from the pressure vessel as entrained solids, etc. Many forms of liquefiable fluids are sold in disposable containers. Small metal tanks containing liquefied propane, liquefied butane and refrigerants, such as, Freon are examples. When containers of such type are filled by a manufacturer who has full control of the starting condition of the container and of the filling procedures and the specifications, a relatively safe product can be distributed to the public. However, sometimes empty or partly empty containers are collected and these are refilled by poorly skilled and poorly equipped persons. The results is often a hazardous product. The non-refillable valve of the invention prevents such problem and associated dangers.

By way of summary, the invention valve is installed on a cylinder and shipped empty to the filler. Filling the cylinder is achieved by means of a passageway through the spud or other nozzle into the chamber in the valve housing and through the bottom passageway into the pressure cylinder. The sealing member is prevented from moving down by means of the force exerted on its top surface by the compression on the deformed arms of elastic sealing member. The compression exerted on the sealing member is sufficient to resist the pressure communicating through passage acting to force sealing member downward. The compressive force is such between sealing member and its top surface to maintain the valve to remain in the open position during shipment. Preferably an O-ring seals the top turnable valve stem during filling to prevent any loss of product to the atmosphere during the filling process. Initially, the valve is in its open position. When the stem is turned to close from the open position, sufficient force can be applied forcing the sealing member downward allowing the compressed area of the sealing member to move outward. The sealing member can then be sealed against the valve seat with sufficient load applied by means of the stem to effectively seal the pressurized contents in the cylinder. The diameter difference between the surfaces is large enough that the sealing member diametrical compression is zero and clearance is provided for the free movement of the sealing member. When the original closure at the time of filling, the stem is turned to open the sealing member will move upward due to the pressure of the cylinder contents acting on the lower surface. In this way, contents can be withdrawn from the cylinder. The stem can be turned until the stop is reached of the valve body. The sealing member travel is limited by a bore surface since in the uncompressed condition, the top of the sealing member has an interference in the design such that such surface cannot be diametrically compressed during its upward travel. The sealing member remains concentric by means of the stem portion within sealing member.

During any attempt to refill the cylinder, the following conditions will occur. Gas would enter the passageway of the spud and enter the central chamber communicating to the upper surface of the valve sealing member forcing it downwardly and sealingly against the surface due to the pressure differential between the chamber and the passage and the cylinder.

BRIEF DESCRIPTION OF THE INVENTION

The preferred embodiments of the invention are shown in the accompanying drawings.

DETAILED DESCRIPTION OF THE INVENTION

Figure 1:
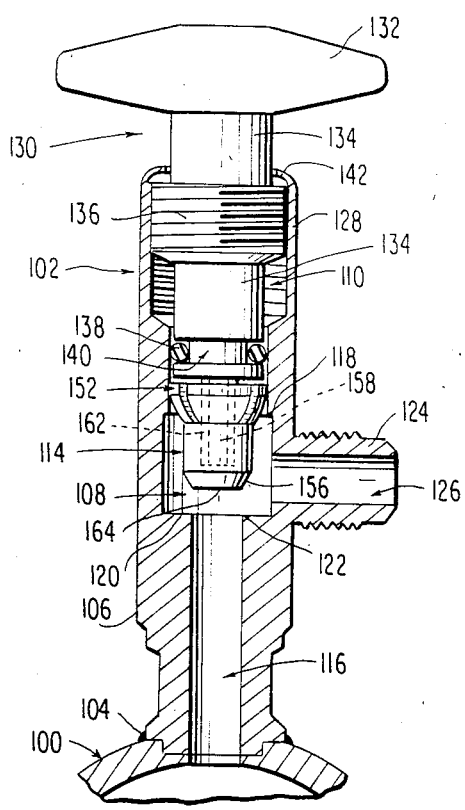
FIG. 1 is a longitudinal cross-sectional view of the non-refillable valve of the invention in its filling position.

Referring to FIG. 1, pressure container or pressure system 100 is provided with non-refillable valve 102 for filling and selective emptying of container 100. Valve 102 can be welded, threaded or otherwise affixed to container 100, as shown in FIG. 1 at 104. In FIG. 1 valve 102 is provided with housing 106 which has central bore 108. Central bore 108 communicates with the interior of container 100. Central bore 108 has uppermost portion or chamber 110, upper portion or chamber 112, middle portion or chamber 114 and lower portion or chamber 116. Upper chamber 110 is smaller in diameter than middle chamber 114, and middle chamber 114 is larger in diameter than lower chamber 116. The interface between upper chamber 112 and middle chamber 114 forms flat, horizontal rim 118. The interface between middle rim 114 and lower chamber 116 forms flat, horizontal rim 120. Sharp edge 122, formed by the interface between flat rim 120 and lower chamber 116, serves as a valve seat. Side outlet nozzle 124 has lengthwise bore 126. Outlet nozzle 124 is positioned on the side of valve housing 106 so that bore 126 communicates directly with the lower region of middle chamber 108. Nozzle 124 is preferably externally threaded for attachment to an external source (not shown) of a pressurized fluid, usually a pressurized gas. Any other suitable attachment means can be used to attach the external source of compressed gas to side nozzle 124.

Wall portion 128 of housing 106 encompasses the sides of uppermost chamber 110, which has a diameter that is larger than that of upper chamber 112. Wall portion 128 can be thinner than the rest of housing 106 because it is not subjected to the force caused by the compressed gas. Wall portion 128 is internally threaded. Valve stem 130 has stem 134 and handle 132, which is mounted on the top end of stem 134. Stem 134 is positioned in uppermost chamber 110 and upper chamber 112. The central portion of stem 134 has enlarged portion 136, which is externally threaded and thereby threadingly engages the internally threaded portion of wall portion 128. In this manner and by means of handle 132, stem 134 can be rotatably turned in central bore 108 so as to advance up or down in uppermost chamber 110 and upper chamber 112. O-ring 138 is mounted in O-ring groove 140 located very near the lower end of stem 134. O-ring 138 can be made of any suitable resilient material, such as, rubber. Upper lip 142 of wall portion 128 is thinner than the interally-threaded portion of wall portion 128. When valve stem 130 is in place in central bore 108, upper lip 142 of wall portion 128 is crimped over as shown in FIG. 1 so as to restrict the upwards movement of enlarged portion 136 of stem 134. Crimped upper lip 142 also prevents the easy removal of valve stem 130 from central bore 108 of housing 106 and provides ease and economy in the manufacture and assembly of valve 102.

While not preferred, different means can be used to retain valve stem 130 in central bore 108. For example, the upper edge of housing 106 can be externally threaded to receive an internally-threaded cap (not shown), which has a central hole therein through which stem 134 fits.

The internally-threaded portion of uppermost chamber 110 has a vertical dimension which is sufficiently short so that O-ring 138 is always in contact with upper chamber 112. O-ring 138 is in compression between the wall of inner chamber 112 and stem 134, thereby providing a hermetic seal between the wall of inner chamber 112 and stem 134 even against pressurized gas.

Figure 3:
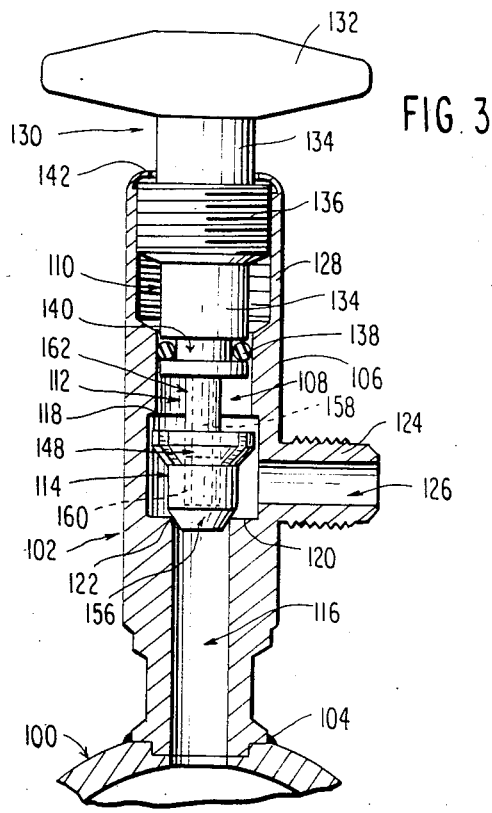
FIG. 3 is a longitudinal cross-sectional view of the non-refillable valve of the invention in its attempted refilling position, after discharge.
Figure 4:
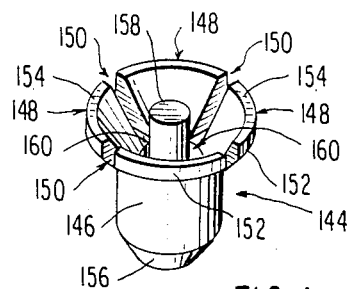
FIG. 4 is a perspective view of the valve sealing member of the invention.

Referring to FIG. 4, valve sealing member 144 contains cylindrical body 146 and upper arms or wings 148. Preferably sealing member 144 has four arms 148, but any suitable number of arms 148 can be used. Arms 148 extend outwardly and upwardly from body 146 as shown in FIG. 4. Slots 150 separate arms 148 from each other. Slots 150 extend all of the way down to block 146. Outer edge 152 of top rim 154 of arms 148 is preferably flat and vertically oriented so as to fit flush against the wall of upper chamber 112 when sealing member 144 is located in compression in upper chamber 112— see FIG. 1. Top rim 154 of arms 148 is preferably flat. The diameter across the top of arms 148, when they are in a non-compressed state, is larger than the diameter of upper chamber 112—see FIG. 3. The bottom of sealing member 144 is flat. The bottom rim of sealing member is bevelled (156) so as to be able to sealingly engage rim 122 as shown in FIG. 3. Post 158 is located in a cylindrical hole in the center of body 146. The hole or passageway does not extend all of the way through body 146. As post 158 is an integral part of both 146 and has a smaller diameter than the hole in body 146, circular slot 160 is formed in body 146 around post 158. Post 158 extends above the top of body 146 to a point even with top rim 154 of arms 148. The top of pin or post 158 is flat.

Figure 2:
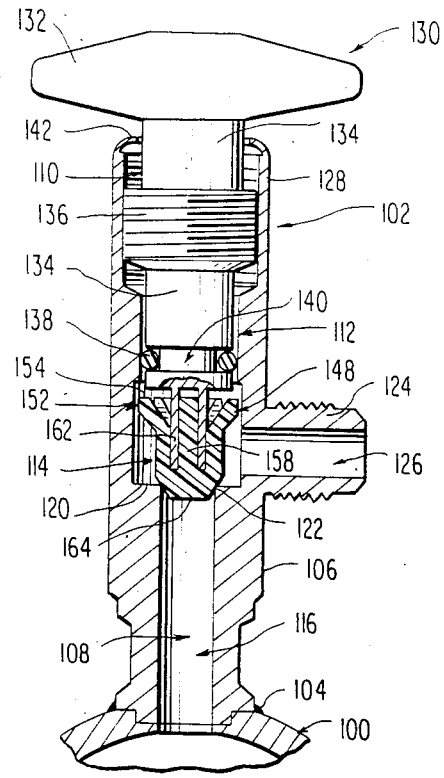
FIG. 2 is a longitudinal cross-sectional view of the non-refillable valve of the invention in its closed position, ready for use.

Tube 162 is located on the bottom of stem 134. Tube 162 rotatably fits in slot 160 of body 146 as best shown in FIG. 2. The fit of tube 162 is close but readily allows pin 158 to travel up and down in tube 162 as shown in FIG. 3.

Valve sealing member is made of a compressible, but resilient material, or in other words, an elastic material. Valve sealing member is preferably made of a resilient or elastic plastic.

To assemble valve 102, valve sealing member 144 is inserted into uppermost chamber 110 with arms 148 pointing upwards. Stem 134 is inserted into central bore 108 so that bottom tube 162 fits over post 158. Valve stem 158 is used to force valve seating member 144 into upper chamber 112. One reason arms 148 of sealing member 144 extend upwards is to prevent the forming of sealing member 144 into upper chamber 112. As sealing member 144 moves into upper chamber 112, the threaded part of expanded portion 136 of stem 134 engages the threaded part of wall portion 128 of housing 106. At this point handle 132 can then be turned to easily force sealing member 144 and O-ring 138 into upper chamber 112. Expanded portion 136 is moved entirely within the threaded part of wall portion 128. The various parts are then in the open-valve position shown in FIG. 1. Upper lip 142 is crimped inwardly to seal expanded portion 136 of stem 134 in upper chamber 136. In this manner, it is difficult to remove valve sealing member from central bore 108. At this point in time, the ends of arms 148 of sealing member 144 are compressed inwardly. As arms 148 are resilient or elastic, compressed arms 148 exert a force against the surface of upper chamber 112 and thereby prevent sealing member 144 from falling into middle chamber 114 (even if valve 102 is dropped, even before being attached to container 100.)

In operation, non-refillable valve 102 is initially in the open, ready-for-filling position shown in FIG. 1. The compressed gas flows from its source through bore 126, middle chamber 114, lower chamber 116 and into pressure vessel 100. Once pressure container 100 is filled, knob 132 is screwed inwardly to force sealing member 144 completely into middle chamber 114. In this manner the effect of compressed arms 148 can be overcome. Once sealing member 144 is in middle chamber 114, compressed arms 148 resiliently return to their original expanded shape. Since the diameter across expanded arms 148 is greater than the diameter of upper chamber 112, sealing member 144 cannot re-enter upper chamber 112. Any upwards pull on or pressure against sealing member 144 would only worsen the situation by causing the further widening of arms 148. If valve stem 130 is removed, it is still basically impossible to remove sealing member 144 out of central bore 108. The size of sealing member 144 is made large enough so that it cannot move more than a few degrees from its vertical axis even if valve stem 130 has been removed from central bore 108. FIG. 2 shows valve 106 in the closed position after container 100 has been filled. To allow the controlled discharge of some of the contents of container 100, knob 132 is screwed outwardly as far as necessary to allow the rate of discharge desired. Sealing member 144, via post 158, can freely move up and down in tube 162 when valve stem 130 is in the up or open position. To stop discharge of the contents of container 100, valve screw 130 is screwed downwards to place sealing member 144 back in the closed or sealing position shown in FIG. 2. After the pressurized gas has been completely discharge from container 100, non-refillable valve 102 prevents any refillng or reuse of container 100. FIG. 3 illustrates how valve 102 prevents refill with pressurized gas. Let us say that valve stem 130 has been screwed outwards as far as it will go (see FIG. 3). In this position sealing member 144 can freely move up and down on the end of valve stem 130 and in middle chamber 114. Usually container 100 is in an upright position and sealing member 144 is in contact with seat 122. When a person tries to refill container 100, the pressurized gas can readily enter the space above sealing member 144 via slots 150 and around the edges of arms 148. Thereby the force acting on the top of sealing member 144 is greater than the force acting on the bottom of sealing member 144 because the exposed area on top of sealing member 144 is greater than the exposed area on the bottom surfaces of sealing member 144. This keeps sealing member 144 forced against seal 122. Even if container 100 is turned upside down or placed on its side so that sealing member 144 is not in contact with sealing edge 122, a suction is created in middle chamber 114 and bottom chamber 116 by the steam of compressed gas which pulls sealing member 144 against sealing edge 122 when one attempts to refill container 100 via outlet nozzle 124.

O-ring 132 and sealing member 144 are the only non-metallic parts (possible also know 132) and they should be made of materials which are chemically resistant to the compressed fluid used in container 100. The rest of the parts of valve 102 should be made of a very strong metal such as steel. Stainless steel should be used if the pressurized gas is corrosive.

One of the important features of the invention is the location of outlet nozzle 124 (i.e. bore 126) in the lower portion of middle chamber 114 below arms 148 of sealing member 144, even when sealing member 144 is in contact with seating edge 122. In such arrangement, sealing member 144 (and some detent) does not interfere with the compressed gas flow path, in and/or out.

Bottom surface 164 of sealing member 144 helps to provide a large area on the bottom surfaces of sealing member 144 during discharge. Bottom surface 164 is hidden to gas pressure during any attempt at refilling container 100.

Figure 5:
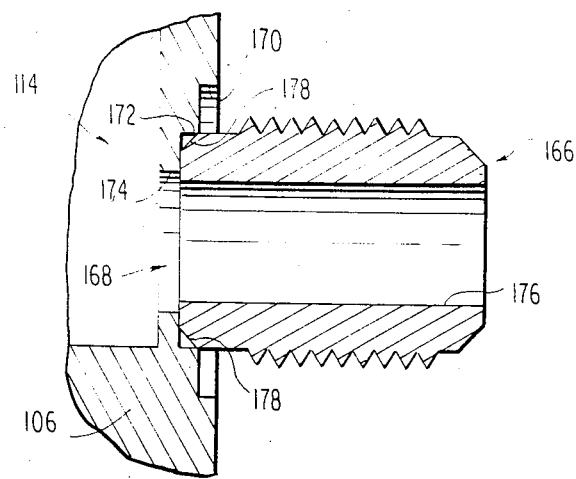
FIG. 5 is a fragmentary cross-sectional view of another version of the side port of the valve of the invention.

FIG. 5 shows a preferred embodiment of the side outlet nozzle (here termed numeral 166). Side port 168 is located in the bottom of middle chamber 114. Side port 168 has stepped portions 170, 172 and 174, each having a larger diameter than the next inwardly step portion. Outlet nozzle 166 contains horizontal bore 176, which communicates with middle chamber 114 via stop portion 174 of side port 168. The end (178) of nozzle 166 is bevelled. The diameter of nozzle 166 is such that it snugly fits within middle step portion 172 with bevel 178 not extending past the interface of step portions 172 and 174. Nozzle 166 can be welded to housing 106 utilizing the ring groove formed by step portion around nozzle 166.

The use of separate outlet nozzle 166 provides increased ease of manufacture and assembly and increased costs savings over the embodiment shown in FIGS. 1 to 3.

Although the invention non-refillable valve has been primarily described above for compressed gas containers, the invention non-refillable valve can be used with pressure fluid containers, such as, pressurized liquid containers.

Although the invention has been described with refrence to some preferred embodiments it is not intended that the broad scope of the herein-described non-refillable valve of the invention be limited thereby but that some modifications and variations are intended to be included within the spirit and scope of the invention as defined by the following claims.

What is claimed is:

1. Non-refillable valve for a pressure container, comprising:

(a) a housing, having a central bore which has a lower portion that is narrower than the middle portion of said central bore and which has an upper portion that is narrower than middle portion of said central bore, and having a side port which communicates with the lower region of said middle portion of said central bore, the lower end of said housing being adapted to sealingly engage said pressure container in a manner which provides communication between said pressure container and said lower portion of said central bore;

(b) an outlet nozzle, having a bore lengthwise therethrough, said outlet nozzle being positioned on the side of said housing and being in communication with said middle portion of said central bore via said side port in said housing;

(c) valve stem means positioned in said upper portion of said central bore in a rotatable manner which advances the valve stem means back and/or forth in said central bore, a tube being mounted on the internal end of said valve stem means which extends into said middle portion of said central bore; and (d) a resilient valve sealing member which has a body portion, an upper flange that extends upwardly and outwardly from said body, a longitudinal passageway being present in the body portion, the bottom portion of the longitudinal passageway not extending through the bottom of the body portion, a vertical post being positioned in the middle of the longitudinal passageway, thereby forming a slot around the vertical post, said post slidingly engaging said tube on the bottom of said valve stem means, said flange portion of said sealing member being compressingly positioned in said upper portion of said central bore when said valve is inactive or being filled, said valve sealing member being pushed into said middle portion by means of said valve stem means when said valve is placed in the active position, said valve sealing member being seated against the interface between said middle and lower portions of said central bore when said valve is closed and said sealing member being positioned in said middle chamber above the seating interface when the valve is used for discharge of said container, and said sealing member sealingly engaging said seating interface when refill of container with pressurized fluid is attempted.

2. Non-refillable valve as claimed in claim 1 wherein said pressure container is a pressurized gas container.

3. Non-refillable valve as claimed in claim 2 wherein said pressurized gas container is a pressurized gas cylinder.

4. Non-refillable valve as claimed in claim 1 wherein said valve stem means is mounted in said upper portion of said central bore in a screwable manner.

5. Non-refillable valve as claimed in claim 1 wherein said valve stem means has an externally-located knob for turning said valve stem means.

6. Non-refillable valve as claimed in claim 1 wherein an O-ring is mounted in a groove in the valve stem means positioned in said upper portion of said central bore and sealingly engages the surface of said upper portion of said central bore.

7. Non-refillable valve as claimed in claim 1 wherein said valve sealing member is made of a resilient plastic.

8. Non-refillable valve as claimed in claim 1 wherein said flange on said body contains at least one vertical slot.

9. Non-refillable valve as claimed in claim 8 wherein there are four vertical slots in said flange, thereby forming four resilient arm portions.

10. Non-refillable valve as claimed in claim 1 wherein said post extends upwards to the top of said flange.

11. Non-refillable valve as claimed in claim 1 wherein the bottom rim of the body portion is bevelled.

* * * * *